(12) United States Patent
Lin

(10) Patent No.: US 7,309,062 B2
(45) Date of Patent: Dec. 18, 2007

(54) FIXED WET TYPE DEHUMIDIFICATION AND ENERGY RECOVERY DEVICE

(76) Inventor: Wen-Feng Lin, 14F, No. 10, Lane 204, Song-Shan Road, Xinyi District, Taipei City (TW)

( * ) Notice: Subject to any disclaimer, the term of this patent is extended or adjusted under 35 U.S.C. 154(b) by 193 days.

(21) Appl. No.: 11/197,366

(22) Filed: Aug. 5, 2005

(65) Prior Publication Data

US 2007/0029685 A1 Feb. 8, 2007

(51) Int. Cl.
*B01F 3/04* (2006.01)

(52) U.S. Cl. ............... 261/154; 261/112.2; 96/266; 96/295; 96/300; 96/326; 96/360; 96/371

(58) Field of Classification Search ............ 261/154, 261/112.2; 96/266, 295, 299, 300, 326, 327, 96/328, 355, 360, 371
See application file for complete search history.

(56) References Cited

U.S. PATENT DOCUMENTS

| | | | | |
|---|---|---|---|---|
| 339,669 A | * | 4/1886 | Lillie | 122/4 R |
| 2,392,601 A | * | 1/1946 | Long | 96/249 |
| 2,700,537 A | * | 1/1955 | Pennington | 261/83 |
| 4,941,324 A | * | 7/1990 | Peterson et al. | 62/94 |
| 4,957,519 A | * | 9/1990 | Chen | 96/326 |
| 5,297,398 A | * | 3/1994 | Meckler | 62/271 |
| 5,471,852 A | * | 12/1995 | Meckler | 62/271 |
| 5,704,966 A | * | 1/1998 | Rohrbach et al. | 95/170 |
| 5,709,736 A | * | 1/1998 | Fujimura | 96/144 |
| 6,036,755 A | * | 3/2000 | Weng | 96/223 |

* cited by examiner

*Primary Examiner*—Scott Bushey
(74) *Attorney, Agent, or Firm*—Troxell Law Office, PLLC

(57) ABSTRACT

A dehumidification and energy recovery device includes a casing defining an interior that is divided into two vertically stacked sections, a channel extending vertically between the sections and forming upper and lower openings, absorption devices arranged inside the channel corresponding to the sections respectively, and a tank arranged below the lower opening of the channel and containing a liquid that is driven by a pump to a position above the upper opening of the channel to drop onto and flow through the absorption devices. Intake airflow and exhaust airflow respectively pass through the sections, contacting the liquid flowing through the channel in a cross-flow fashion, whereby exchange of humidity and heat is performed between the airflows and the liquid to effect dehumidification and energy recovery with a simple structure and low costs.

10 Claims, 8 Drawing Sheets

FIXED WET TYPE DEHUMIDIFICATION AND ENERGY RECOVERY DEVICE

FIELD OF THE INVENTION

The present invention generally relates to a fixed wet type dehumidification and energy recovery device, which is particularly suitable for applications where control of humidity and temperature is required.

BACKGROUND OF THE INVENTION

In a humid area, such as an island, the humidity is always high all year round. Dehumidification is an important factor for general living and industry. The operation of dehumidification is to remove moisture from air, making dry air that is suitable for human body health as well as industry activity.

The most commonly known ways for dehumidification include cooling, compression, chemicals, such as solid type adsorption agent and liquid type absorption agent, and honeycomb type moisture adsorption. The conventional dehumidification facility is expensive in both installation and maintenance, which make them impractical for general uses.

On the other hand, besides humidity and temperature control, the developed modem society also emphasizes on noise control and quality of surrounding air. However, for sound insulation and aesthetic purposes, interior decoration of buildings is often done with substance that may generate toxicant material due to aging. Such toxicant may cause damage to human health, especially in a closed space inside the building.

Thus, to ensure quality of air and for ventilation purposes, it is common to guide external, fresh air into the building and to expel or discharge interior air from the building. However, the external surrounding air is often in a condition of high humidity and high temperature, which becomes a large load to the air conditioning system of the building. Total heat exchange is often employed in buildings with air conditioning system to exchange humid heat and latent heat between the expelled air and the intake fresh air for energy recovery. This reduces energy consumption of the air conditioning system and constantly keeps air fresh inside the building.

FIG. 8 of the attached drawings shows a conventional total heat exchange system, which comprises a casing A defining an interior that is divided into two sections and a honeycomb rotor B rotatably mounted inside the casing A. Partitions are required between the sections of the casing A and the honeycomb rotor B to eliminate leakage of and mixture between intake air and exhaust air. Due to wearing caused by rotation of the honeycomb rotor B on the partitions between the honeycomb rotor B and the sections of the casing A, leakage or contamination will eventually occur.

Thus, the present invention is aimed to provide a dehumidification and energy recovery device that is low is cost and simple in construction to overcome the deficiency of the conventional devices.

SUMMARY OF THE INVENTION

A primary objective of the present invention is to provide a fixed wet type dehumidification and energy recovery device that has a simple structure and thus low costs of manufacturing.

To achieve the above objective, in accordance with the present invention, a dehumidification and energy recovery device comprises a casing defining an interior that is divided into two vertically stacked sections, respectively forming air intake passage and air exhaust passage; a channel extending vertically between the sections and forming upper and lower openings; absorption devices arranged inside the channel corresponding to the sections respectively; and a tank arranged below the lower opening of the channel and containing a liquid that is driven by a pump to a position above the upper opening of the channel to drop onto and flow through the absorption devices. Intake airflow and exhaust airflow respectively pass through the sections, contacting the liquid flowing through the channel in a cross-flow fashion, whereby exchange of humidity and heat is performed between the airflows and the liquid to effect dehumidification and energy recovery with a simple structure and low costs.

BRIEF DESCRIPTION OF THE DRAWINGS

The present invention will be apparent to those skilled in the art by reading the following description of preferred embodiments thereof, with reference to the attached drawings, in which.

DETAILED DESCRIPTION OF THE PREFERRED EMBODIMENTS

Figure 1:
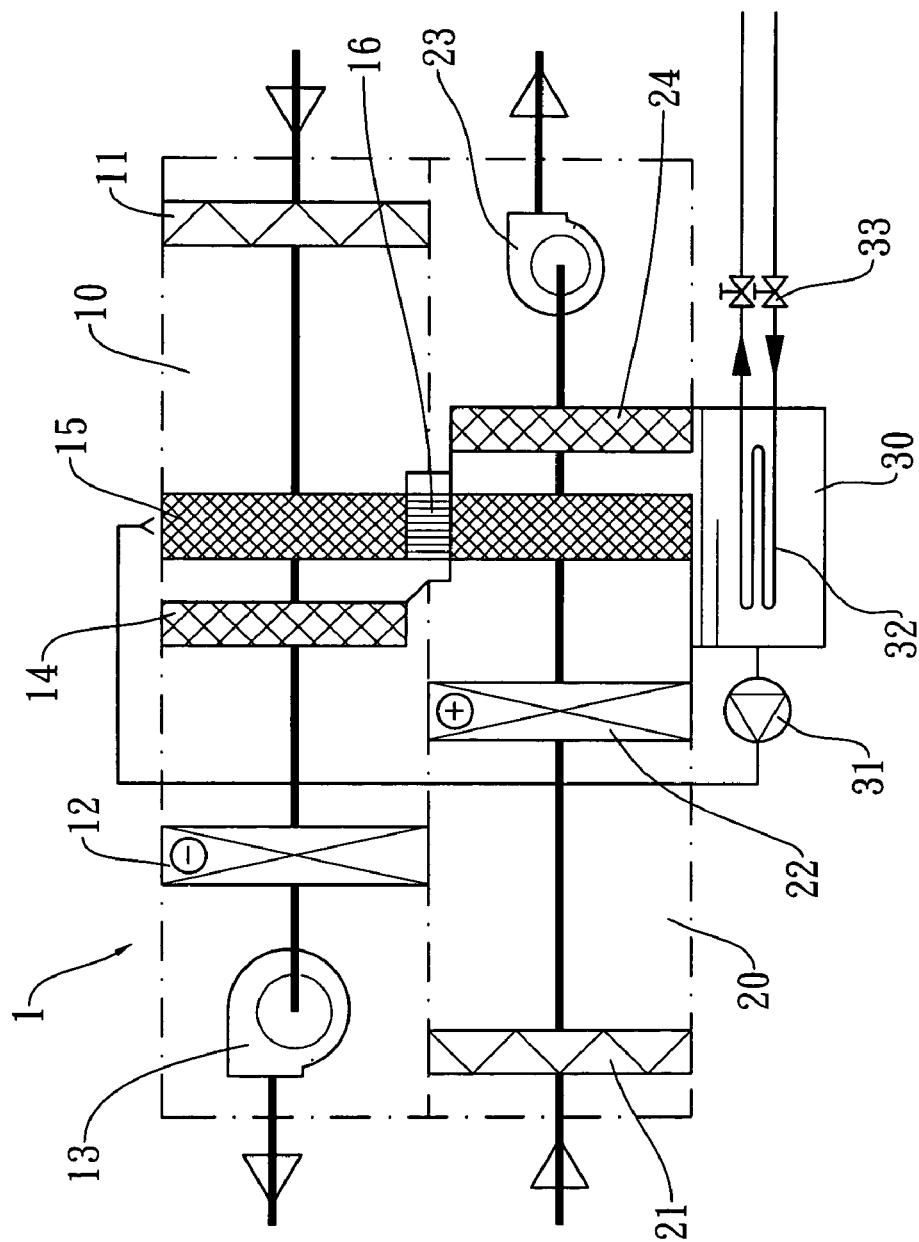
FIG. 1 is a schematic view illustrating a dehumidification and energy recovery device constructed in accordance with a first embodiment of the present invention.

With reference to the drawings and in particular to FIG. 1, a fixed wet type dehumidification and energy recovery device constructed in accordance with a first embodiment of the present invention comprises a casing 1 defining an interior space that is divided into two sections 10, 20, which will also be referred to as first section 10 and second section 20 for simplifying the description, functioning as intake air passage and exhaust air passage respectively. In the embodiment illustrated, the first and second sections 10, 20 form a vertical stack with the first section 10 on the second section 20.

Vertically extending between the first and second sections 10, 20 and opening to top and bottom walls of the first and second sections 10, 20 is a channel (not labeled) inside which absorption means comprising at least one absorption device 15 is disposed. In the embodiment illustrated, the absorption means comprises two absorption devices 15 corresponding to the sections 10, 20, respectively.

The first and second sections 10, 20 each form an inlet port to which a filter screen 11, 21 is mounted, and an opposite outlet port in which a blower 13, 23 is mounted. Air is allowed to flow from the inlet port to the outlet port along each section 10, 20 (or the air passages defined by the sections 10, 20). The first and second sections 10, 20 each also comprise a baffle board 14, 24 disposed downstream the inlet port thereof.

A tank 30 is arranged below the lower opening of the channel, and is connected, by piping on which a pump 31 is mounted, to a position above the upper opening of the channel. The tank 30 is provided with an automatic replenishment valve means 33, which connects the tanks to an external source (not shown). A cooler 32 is selectively arranged inside the tank 30.

Figure 2:
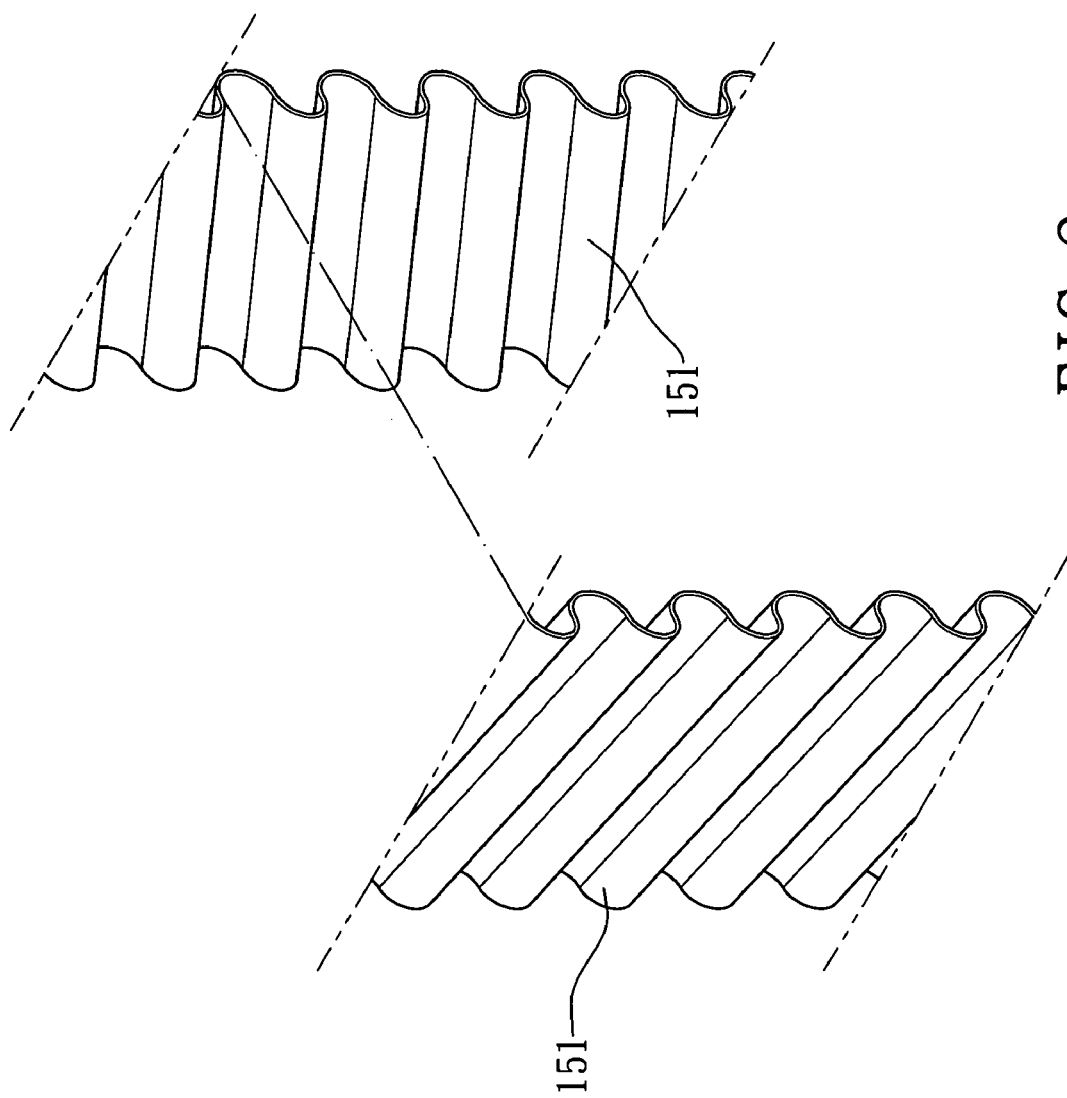
FIG. 2 a perspective view of an absorption device of the dehumidification and energy recovery device of the present invention with identical elements removed for simplification.

Also referring to FIG. 2, the absorption device 15 is composed of a plurality of boards, made of ceramic fibers, stacked over each other. Each board has corrugation, and thus forming a honeycomb board 151. In the embodiment illustrated, the corrugation of the honeycomb board 151 comprises a wavy configuration having rounded ridges and troughs extending in an inclining direction from upper left side to lower right side, as shown in FIG. 2, which makes opposite ends of each ridge or trough different at positions. Each honeycomb board 151 is arranged close to the next one but in an alternating manner, which means the apex of a ridge of the next honeycomb board 151 is adjacent to the bottom of the trough of the previous honeycomb board 151, whereby proper gaps are formed between adjacent honeycomb boards 151 for flow of liquid and air therethrough.

Figure 3:
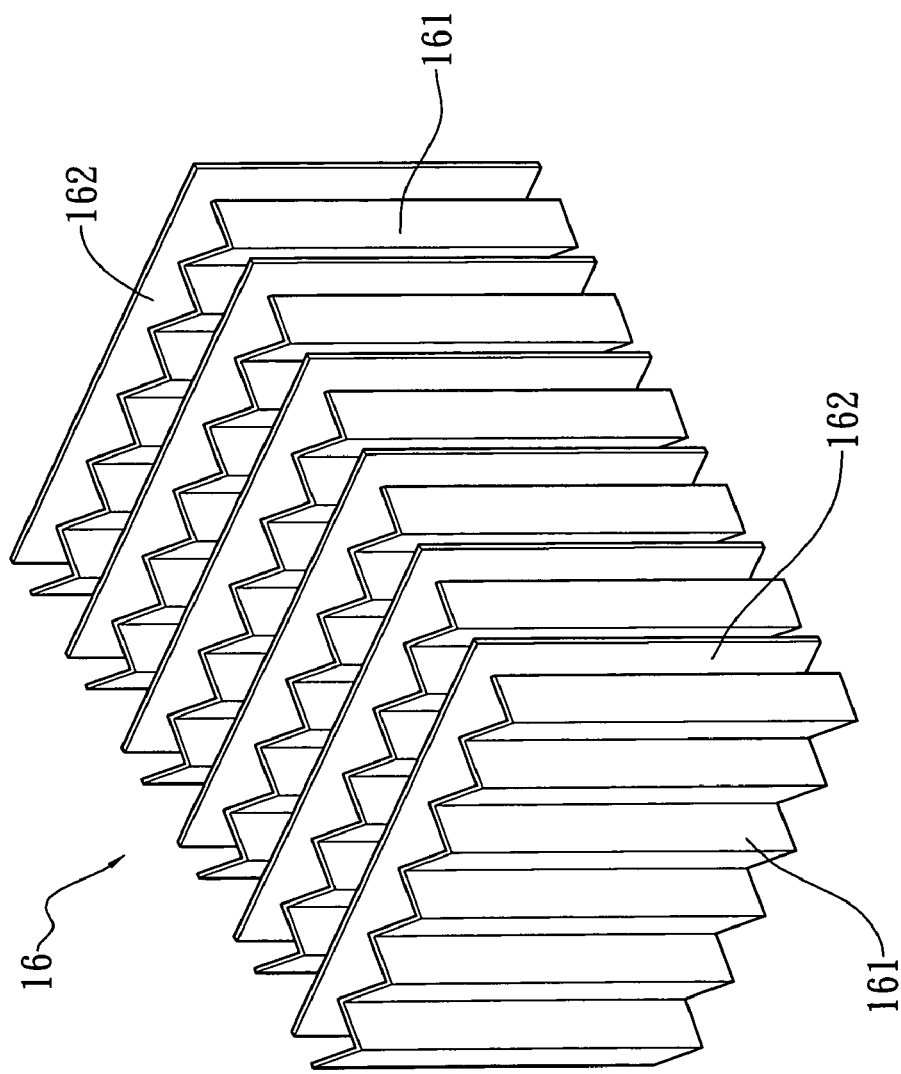
FIG. 3 is a perspective view of a section separation device of the dehumidification and energy recovery device of the present invention.

Also referring to FIG. 3, a separation device 16 is also arranged inside the channel and between the two absorption devices 15. The separation device 16 is composed of a plurality of boards made of ceramic fibers, forming a stack. The stack includes flat boards 162 each interposed between adjacent corrugated honeycomb boards 161. In the embodiment illustrated, the corrugation of the honeycomb board 161 is of saw-tooth like configuration, which has sharp apexes. The corrugation of the honeycomb board 161 in the stack is substantially aligned with that of the next honeycomb board 161. The separation device 16 serves to isolate the two sections 10, 20, preventing leakage or contamination or exchange of fluids from occurring between the two sections 10, 20.

To dehumidify, the first and second sections 10, 20 serve as dehumidification section 10 and regeneration section 20, respectively. Inside the dehumidification section 10, a cooler 12 is arranged between the blower 13 and the baffle board 14, while inside the regeneration section 20, a heater 22 is arranged between the filter screen 21 and the absorption device 15. The tank 30, inside which the cooler 32 is arranged, is filled up with a moisture-absorption liquid agent, which can be any known chemical solution that is capable to absorb moisture.

By supplying power to the dehumidification and energy recovery device, the blowers 13, 23, the coolers 12, 32, the heater 22, and the pump 31 are actuated. The moisture-absorption liquid inside the tank 30 is cooled down due to the operation of the cooler 32 and is driven by the pump 31 to the position above the dehumidification section 10, from which the liquid drops onto the absorption device 15 of the dehumidification section 10 through the upper opening of the channel inside which the absorption device 15 is disposed. The liquid then flows along the channel through the absorption devices 15, by which some of the liquid is kept in each absorption device 15, and the section separation device 16 to return back to the tank 30 for circulation. The baffle boards 14, 24 on opposite sides of the channel help preventing the liquid from splashing into the other portions of the sections 10, 20.

Air containing moisture enters the inlet port of the dehumidification section 10. The filter screen 11 removes particles of large size entraining the airflow. The filtered airflow then passes through the absorption device 15 to contact with the moisture-absorption liquid, whereby the moisture contained in the air is at least partially removed, resulting in an airflow of lower humidity, which will be referred to as "dry air" hereinafter. The dry air then flows through the cooler 12 to discharge out of the dehumidification and energy recovery device.

The moisture-absorption liquid that absorbs the moisture from the airflow of the dehumidification section 10 then passes through the separation device 16 into the absorption device 15 of the regeneration section 20. Air from the surroundings is sucked into the regeneration section 20 through the inlet port of the section 20, and is also subject to particle filtration by the filter screen 21. The filter air is then heated by the heater 22. The heated air is brought into contact with the moisture-absorption liquid inside the absorption device 15 of the regeneration section 20 to remove moisture from the moisture-absorption liquid that flows through the absorption device 15 to complete the operation of dehumidification.

Figure 5:
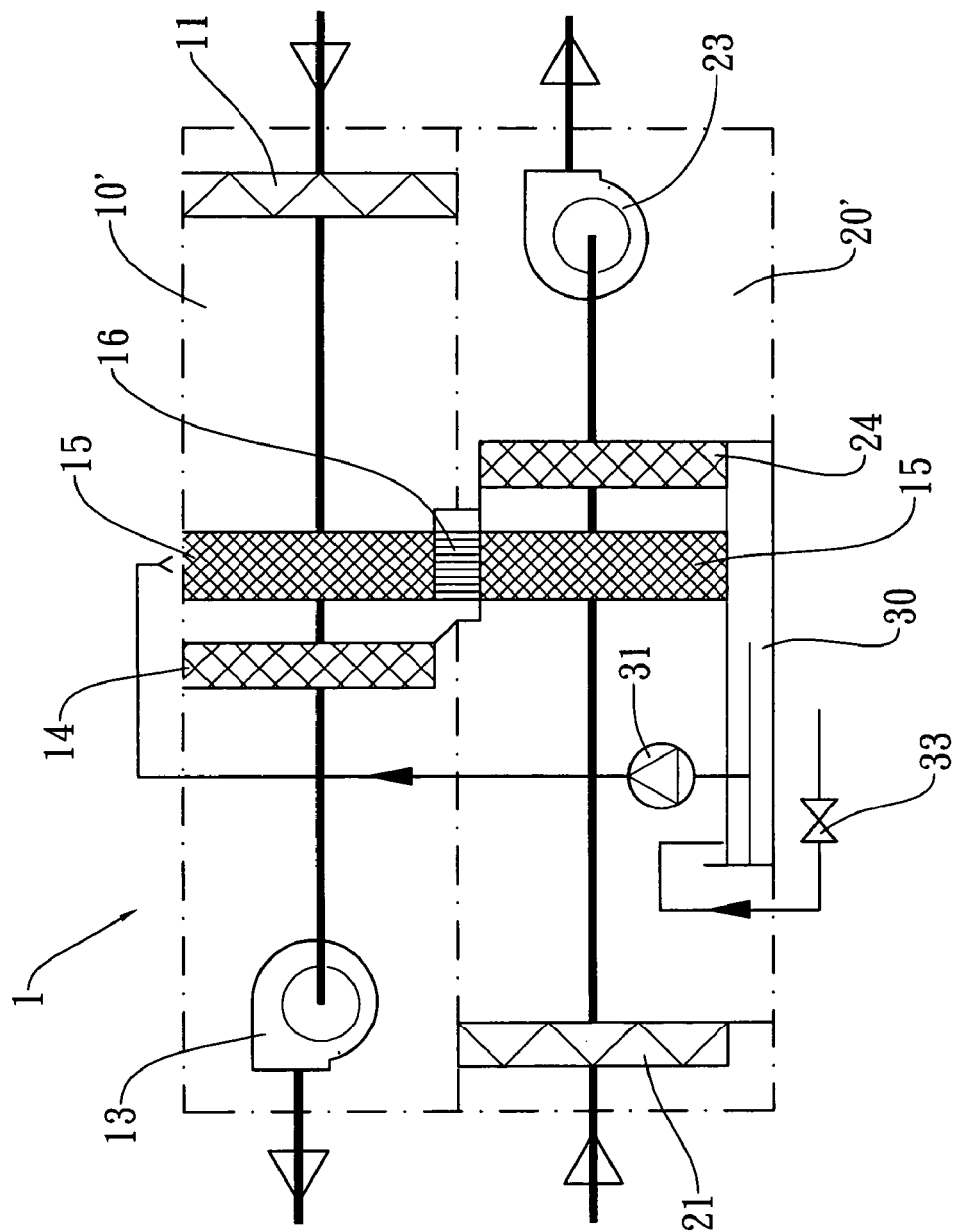
FIG. 5 is a schematic view illustrating a dehumidification and energy recovery device constructed in accordance with a second embodiment of the present invention.

Referring to FIG. 5, which illustrates a dehumidification and energy recovery device in accordance with a second embodiment of the present invention that is employed in an application of heat recovery, in this case, the first and second sections 10, 20 serve as intake air exchange section 10' and exhaust air exchange section 20' forming a vertical stack. Again, a channel (not labeled) vertically extends between the sections 10', 20' and two absorption devices 15 are arranged inside the channel at positions corresponding to the intake air exchange section 10' and the exhaust air exchange section 20'. A separation device 16 is also arranged inside the channel and between the absorption devices 15. They are of the same constructions as those shown in FIGS. 2 and 3. The absorption device 15 is composed of a stack of boards made of glass fibers and forming a wavy configuration comprising corrugation of alternating rounded ridges and troughs extending in an inclining direction from left upper side to right lower side to make opposite ends of the ridges and troughs different at positions. The corrugated boards are stacked in an alternate manner whereby proper gaps are formed between adjacent boards. A tank 30 is provided below a lower opening of the channel and is filled up with a liquid, such as water (or pure water) and non-frozen liquid agent. A pipe extends from the tank 30 to a position above an upper opening of the channel and a pump 31 is mounted in the piping for driving the liquid to the position above the upper opening of the channel.

By supplying power to the dehumidification and energy recovery device, blowers 13, 23 that are similarly arranged inside the sections 10', 20' respectively, and the pump 31 are actuated. The pump 31 drives the liquid from the tank 30 to the position above the upper opening of the channel to allow the liquid to drop into the channel, flowing through the absorption devices 15 and then back into the tank 30. Baffle boards 14, 24 that are similarly arranged inside the sections 10', 20' on opposite sides of the absorption devices 15 help preventing splashing of the liquid that flows through the absorption devices 15.

Under the situation that the intake air flow rate and the exhaust air flow rate are identical, which means the ratio between the intake air flow rate and the exhaust air flow rate is one, and that the efficiency of heat exchange is 70%, air inside a closed indoor space that is at a temperature of 25° C. is sucked into the exhaust air exchange section 20' through a filter screen 21 arranged at an inlet port of the section 20' for removing undesired particles. The intake airflow then passes through the absorption device 15 of the section 20' to contact the liquid flowing through the absorption device 15, which lowers down the temperature of the liquid.

Outdoor air, which is at temperature of 35° C., is taken into the intake air exchange section 10', flowing through the absorption device 15 of the section 10' to contact the liquid of which the temperature has been lowered down previously by the indoor air. This makes the outdoor air that is driven through the intake air exchange section 10' into the closed indoor space cooled down to a temperature of 28° C., thereby effectively reducing the load of an air conditioner that is employed to lower the temperature of the closed indoor space. The difference of temperature between the indoor air and outdoor air, which are at 25° C. and 35° C., respectively, is 10 degrees, which, when multiplied by the heat exchange efficiency of 70%, makes a difference of 7 degrees. By subtracting 7 degrees from the outdoor air temperature 35° C., the air entering the indoor space is 28° C.

Similarly, in cold days when the outdoor temperature is lower than the indoor temperature, the indoor air, which is assumed a temperature of 20° C., is taken into the exhaust air exchange section 20' through the filter screen 21 and then flows through the absorption device 15 to contact the liquid. The temperature of the liquid is raised up by heat exchange caused by contact between the air and the liquid.

Outdoor air, which is at a temperature of 8° C., is taken into the intake air exchange section 10' to flow through the absorption device 15 for contacting the liquid of which the temperature has been previously raised up, which increases the temperature of the intake outdoor air. The difference between the indoor air temperature and the outdoor air temperature is 12 degrees, which, multiplied by the heat exchange efficiency of 70%, make an increase of approximately 8 degrees for the intake outdoor air. The air that finally flows into the indoor space is at a temperature of 16° C. (=8+8). This effectively reduces the load of a warmer that heats the indoor space.

Figure 4:
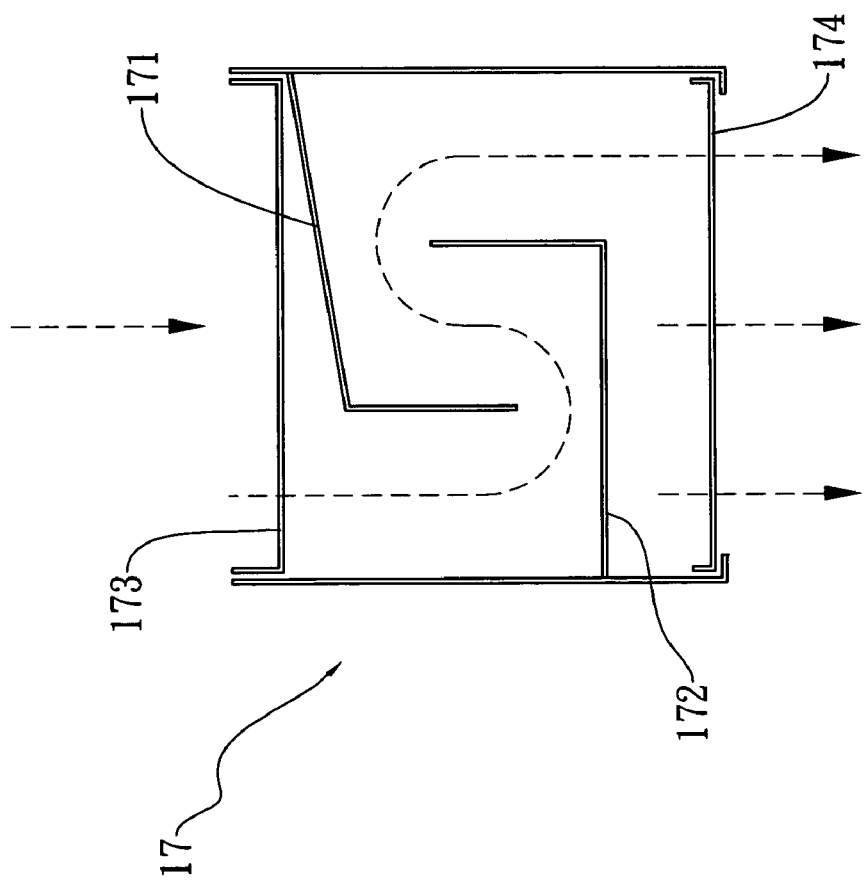
FIG. 4 is a cross-sectional view of a separator comprising a liquid storage tank that is employed in the dehumidification and energy recovery device in accordance with the present invention.

Airs that enter both sections 10', 20' contact with the liquid flows through the absorption devices 15, which are separated by the separation device 16. However, the separation device 16 discussed previously only functions for applications where pressure difference between the sections 10', 20' is small. For applications where pressure difference between the sections 10', 20' is significant, a more powerful separator 17 must be installed to replace the separation device 16. FIG. 4 particularly shows the separator 17, which comprises an L-shaped board 172, which, together with sidewalls, forms a water storage tank. An inclined L-shaped board 171 is opposite to the tank. Upper and lower openings of the separator 17 are provided with perforated boards 173, 174. Thus, when the liquid falling onto the absorption device 15 above the separator 17, the liquid flows into the separator 17 through the perforated board 173 and is guided by the inclined board 171 to enter and is thus kept in the tank formed by the board 172. Due to the liquid stored in the tank, airs of the two sections 10', 20' are prevented from exchange or mixing with each other. Once the tank is full, the liquid flowing into the tank overflows the L-shaped board 172 to pass through the absorption device of the lower section 20', returning back to the tank 30.

Figure 6:
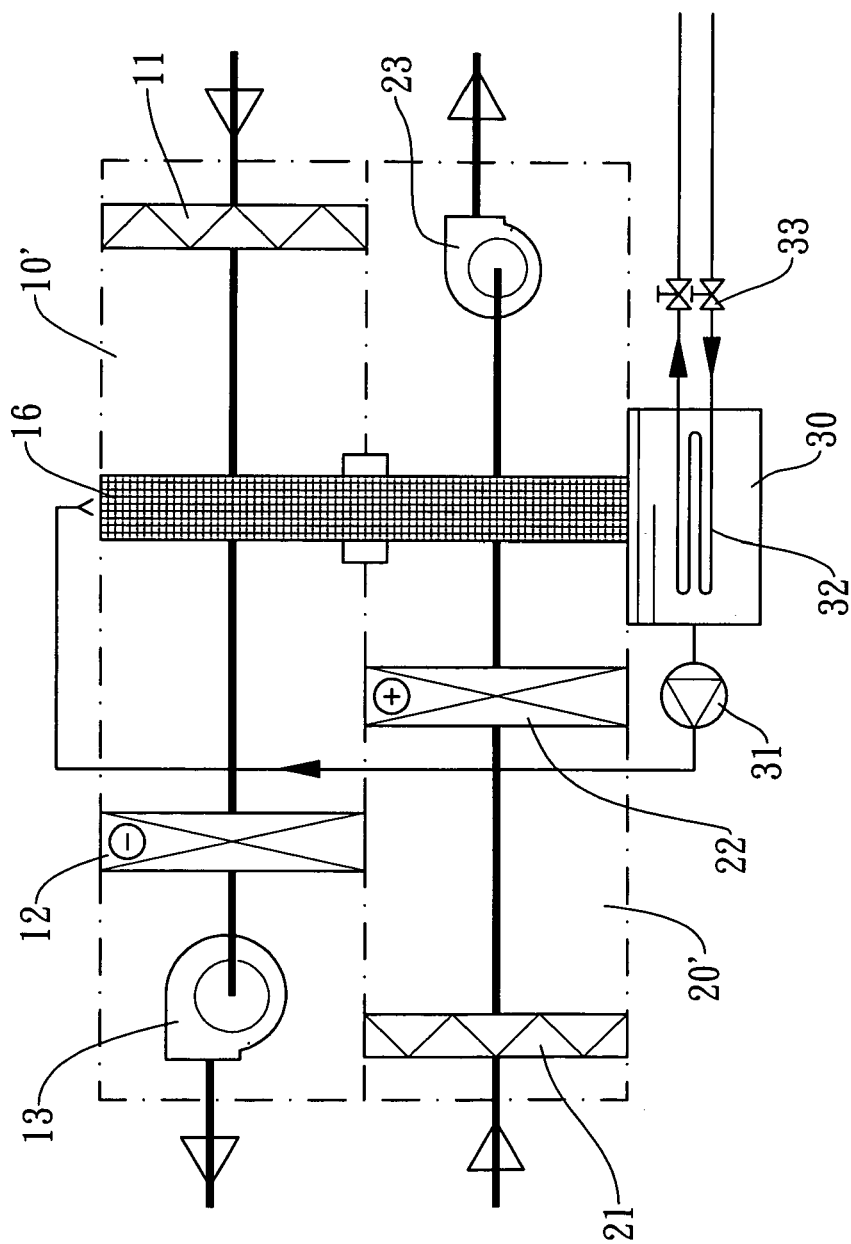
FIG. 6 is a schematic view illustrating a dehumidification and energy recovery device constructed in accordance with a third embodiment of the present invention.
Figure 7:
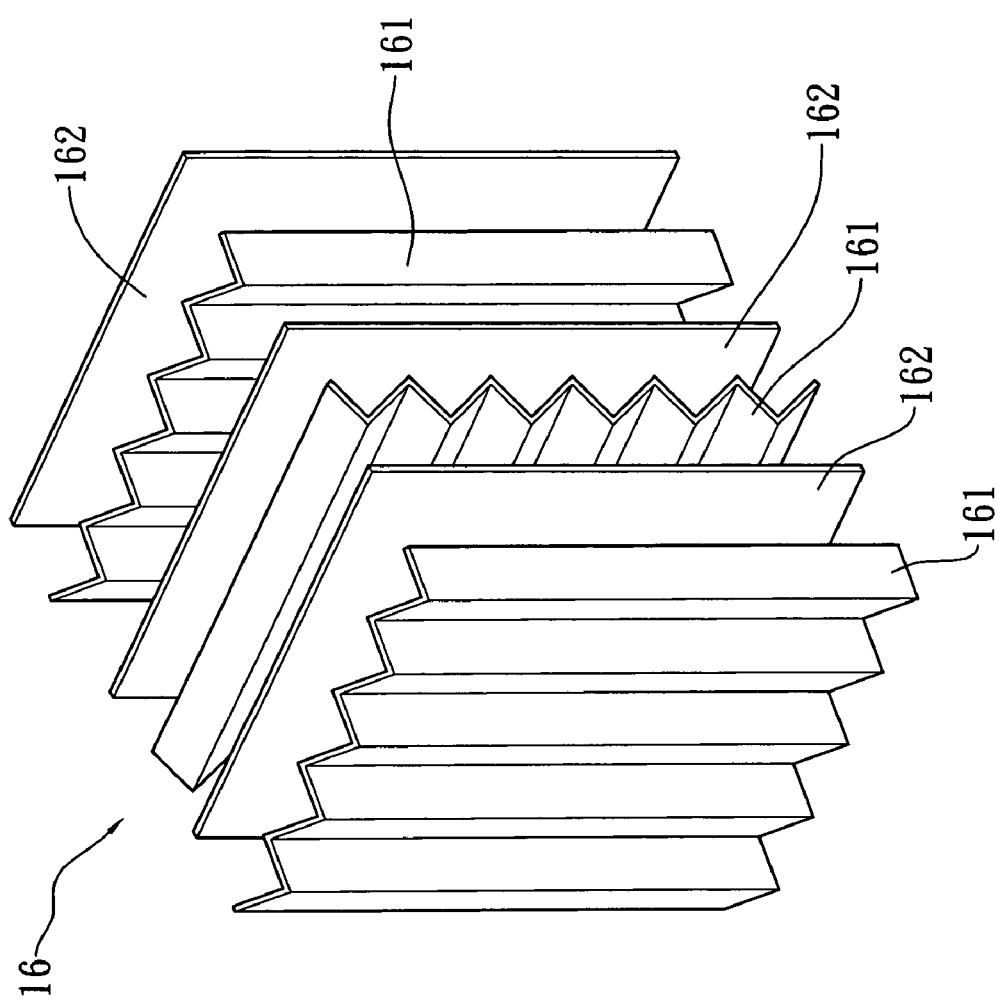
FIG. 7 is a perspective view of an absorption device of the dehumidification and energy recovery device in accordance with the third embodiment of the present invention.
Figure 8:
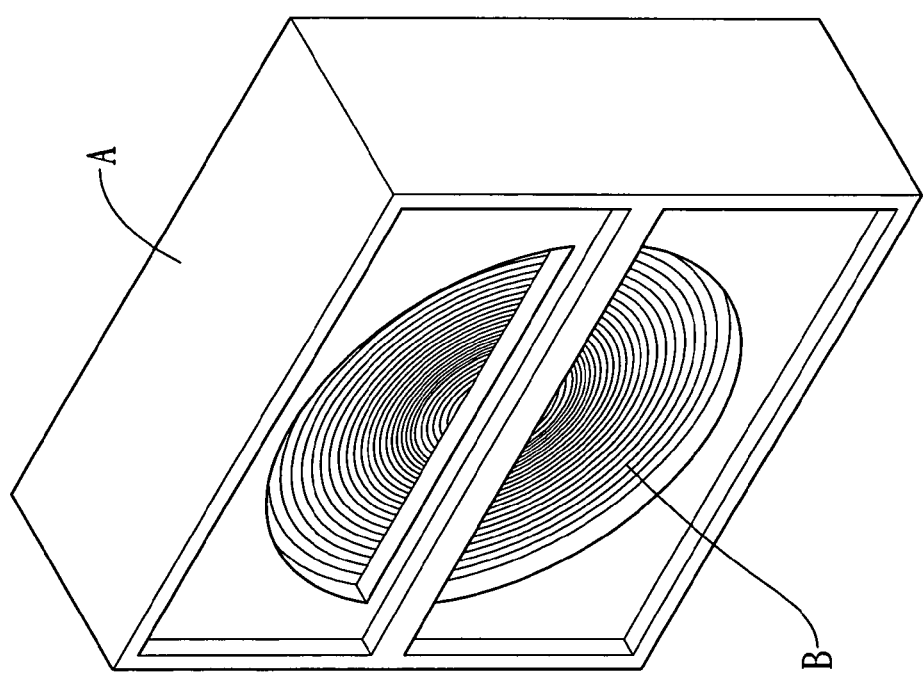
FIG. 8 is a perspective view illustrating a conventional total heat exchange type heat exchanger.

Referring now to FIGS. 6 and 7, which shows a third embodiment of the present invention, the absorption device that is arranged inside the channel extending through the casing in accordance with the third embodiment comprises a plurality of boards including flat boards 162 and honeycomb boards 161 that form corrugations, both made of glass fibers. The corrugation of the honeycomb board 161 comprises a saw-tooth-shaped configuration. The honeycomb boards 161 and the flat board 162 are alternately stacked. The honeycomb boards 161 of odd numbers are oriented in a vertical direction, while the honeycomb boards 161 of even numbers are oriented in a horizontal direction, whereby the honeycomb board 161 immediately before each flat board 162 and that immediately after the flat board 162 are angularly offset by 90 degrees. Thus, airs flowing through the channel extending between the sections 10',20' is separated from the liquid flowing through the channel and physical contact between air and the liquid is prevented and contamination of the liquid by foreign object entraining air flow is avoided.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A fixed wet type dehumidification and energy recovery device comprising:
    a casing defining an interior space that is divided into two sections;
    a channel extending between the sections and containing absorption means;
    a filter screen mounted to an inlet port of each section;
    a blower arranged in an outlet port of each section;
    a tank arranged below a lower opening of the channel and containing a liquid and further comprising an automatic replenishment valve and piping extending from the tank to a position above an upper opening of the channel; and
    a pump arranged on the piping,
    wherein the absorption means comprises two absorption devices arranged inside the channel and separated by a separator that is arranged inside the channel, the separator comprising an L-shaped board that forms a liquid storage tank, an inclined board opposing the liquid storage tank, and perforated boards on opposite sides of the liquid storage tank.

2. The dehumidification and energy recovery device as claimed in claim 1 further comprising a baffle board arranged downstream the channel in each section.

3. The dehumidification and energy recovery device as claimed in claim 1, wherein the sections comprise a dehumidification section and a regeneration section, a heater being arranged inside the regeneration section behind the filter screen, whereby the dehumidification and energy recovery device functions as a dehumidifier.

4. The dehumidification and energy recovery device as claimed in claim 1, wherein the absorption devices comprise corrugated boards made of ceramic fibers.

5. The dehumidification and energy recovery device as claimed in claim 4, wherein the absorption devices comprise corrugated boards that are arranged in an alternate manner.

6. The dehumidification and energy recovery device as claimed in claim 1, wherein the absorption means comprises flat boards and saw-tooth-shaped corrugated boards alternately stacked together, the corrugated board immediately before a flat board being oriented in a direction that is offset at 90 degrees with respect to the corrugated board immediately after the flat board.

7. The dehumidification and energy recovery device as claimed in claim 1, wherein the liquid contained in the tank comprises a moisture-absorption solution when the dehumidification and energy recovery device functions as a dehumidification device.

8. The dehumidification and energy recovery device as claimed in claim 1, wherein the tank comprises a cooler therein when the dehumidification and energy recovery device functions as a dehumidification device.

9. The dehumidification and energy recovery device as claimed in claim 1, wherein the liquid contained in the tank comprises a solution selected from a group consisting of water, pure water, and non-frozen liquid when the dehumidification and energy recovery device functions as an energy recovery device.

10. A fixed wet type dehumidification and energy recovery device comprising:

a casing defining an interior space that is divided into two sections;

a channel extending between the sections and containing absorption means;

a filter screen mounted to an inlet port of each section;

a blower arranged in an outlet port of each section;

a tank arranged below a lower opening of the channel and containing a liquid and further comprising an automatic replenishment valve and piping extending from the tank to a position above an upper opening of the channel; and a pump arranged on the piping, wherein the absorption means comprises two absorption devices arranged inside the channel and wherein a separation device is also arranged inside the channel between and separating the two absorption devices, wherein the absorption devices and the separation device both comprise corrugated boards made of ceramic fibers, wherein the absorption devices comprise corrugated boards that are arranged in an alternate manner and wherein the separation device further comprises flat boards interposed between adjacent corrugated boards, the corrugated boards being in alignment with each other.

* * * * *